Figure 1:
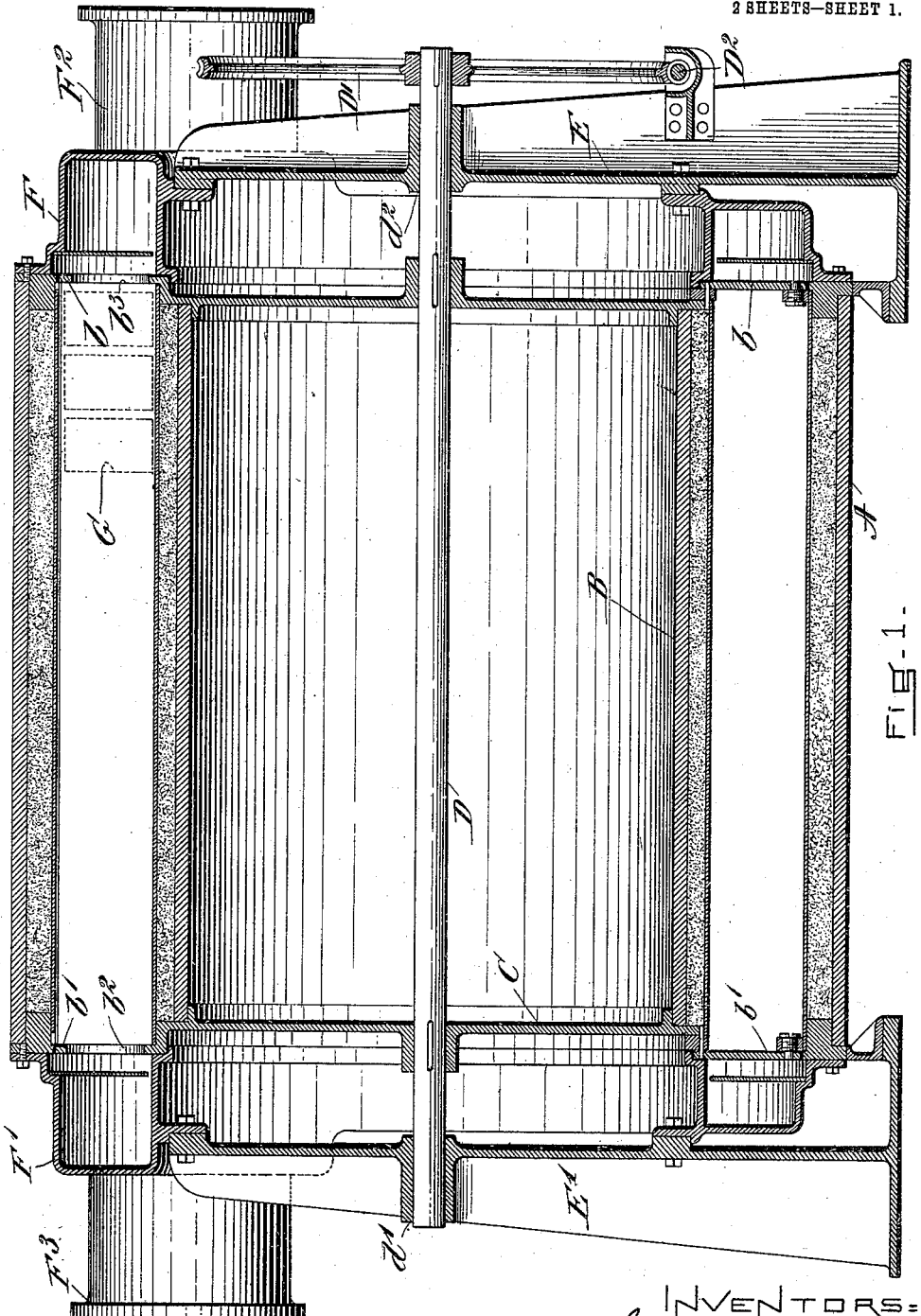

L. V. ESTES & W. FORWARD.
APPARATUS FOR RESHAPING COLLARS AND ANALOGOUS ARTICLES.
APPLICATION FILED JUNE 5, 1909.

966,434.

Patented Aug. 9, 1910.
2 SHEETS—SHEET 2.

WITNESSES:
Josephine H. Ryan
Charles D. Wachery

INVENTORS:
Loring V. Estes,
William Forward,
by Roberts, Roberts & Cushman
Attorneys.

ed States, and residents of Troy, in the county of Rensselaer and State of New York, have invented new and useful Improvements in Apparatus for Reshaping Collars and Analogous Articles, of which the following is a specification.

UNITED STATES PATENT OFFICE.

LORING V. ESTES AND WILLIAM FORWARD, OF TROY, NEW YORK, ASSIGNORS TO CLUETT, PEABODY & COMPANY, OF TROY, NEW YORK, A CORPORATION OF NEW YORK.

APPARATUS FOR RESHAPING COLLARS AND ANALOGOUS ARTICLES.

966,434. Specification of Letters Patent. Patented Aug. 9, 1910.

Application filed June 5, 1909. Serial No. 500,276.

*To all whom it may concern:*

Be it known that we, LORING V. ESTES and WILLIAM FORWARD, both citizens of the United States, and residents of Troy, in the county of Rensselaer and State of New York, have invented new and useful Improvements in Apparatus for Reshaping Collars and Analogous Articles, of which the following is a specification.

Our invention relates to the manufacture of such articles as collars and particularly to the manufacture of turn-down collars which require more careful shaping than other kindred articles in order that they may be sent to the consumer in perfect condition, and consists in a machine for shaping or re-shaping articles of this character.

The invention and improvements which form the subject matter of this specification are applicable either wholly or partly to the shaping of collars in a moist condition during the laundrying operations or may be employed for re-shaping finished collars according to a method which we have invented and which forms the subject matter of an application filed concurrently herewith by us in the United States Patent Office and serially numbered 500,277.

Our invention and improvements are addressed particularly to the utilities incident to the performance of our said new method and we therefore describe herein the said new method for the purpose of affording as complete an understanding as possible of the nature and utilities of the mechanical invention and improvements.

At present the last operation in the manufacture of collars is the laundrying during which the collars are starched, ironed and shaped; it is necessary, however, to submit the collars to inspection after the laundrying operation in order to discover such defects as may exist which were not detected by any previous inspection after earlier stages in the manufacture. The laundrying operation occasionally develops and makes apparent defects which previously have been concealed, and also some defects in the finished article which are occasionally produced in the laundrying operation. In the case of such articles as turn-down collars, this final inspection of the finished goods which are, as a rule, tied together in bundles of a dozen each, necessitates the opening of the folds of the collars by the inspector. This handling distorts the collars more or less from the correct shape previously given to them in the laundry, and therefore, deteriorates the appearance of the goods and interferes with the proper fitting thereof on the first occasion of wear by the user. The defects caused by final inspection are, it is true, superficial and temporary for the reason that the first time the collar is laundried after being worn, skillful laundrying will restore it to the correct shape which was given to it originally by the manufacturer's laundry. Nevertheless, it is desirable from the point of view not only of the user, but also of the retailer to whom attractiveness in articles for sale is a desideratum, that the distortions from correct shape occasioned by the necessary final inspection of the goods shall be corrected.

The object of our said method herein described is to restore finished collars and the like to their proper shape after they have been distorted by the final inspection, without necessitating the repetition of any of the manufacturing processes, including laundrying, through which the articles have been already passed and which, indeed, if repeated, would necessitate still further inspection and be therefore useless to accomplish my purpose.

We are aware that the shaping of collars in the laundry is an old and well known step in the finishing process, but so far as we are informed, the shaping heretofore has involved the heating and drying of the collars which when confined in the desired shape are moist either throughout their body or structure or else in such portions, such as the folds or turns, where the shaping operation has the greatest effect. Thus, the laundry shaping of the collars and the like has heretofore involved the preliminary moistening and subsequent drying of the article which is held or confined in proper shape until the drying is complete.

Remoistening and reshaping of finished collars after final inspection would hardly be a practicable method of correcting the distortions due to inspection. We have discovered, however, that if such a finished article as a collar has been distorted as by inspection and it is then tightly rolled and held either alone or in a roll with other articles of the same nature, and is then, although dry, subjected for a sufficient time to dry heat, the effect of the confinement and heat so remolds the starch incorporated with the fabric that the collar or similar article will emerge from this treatment correctly reshaped and in the same perfect condition as to shape as when it came from the laundry. Furthermore, such treatment by dry heat and confinement will improve the condition and finish of collars and the like especially in their appearance in parcels or bundles such as are ordinarily exposed for sale.

While the machine herein described is designed and adapted particularly for the convenient performance of our said method it is nevertheless, adapted to other uses as for instance, the preliminary shaping of collars and the like in an initially moist condition during the laundrying process.

One embodiment of the invention and improvements herein described is illustrated in the accompanying drawings hereto annexed.

Figure 2:
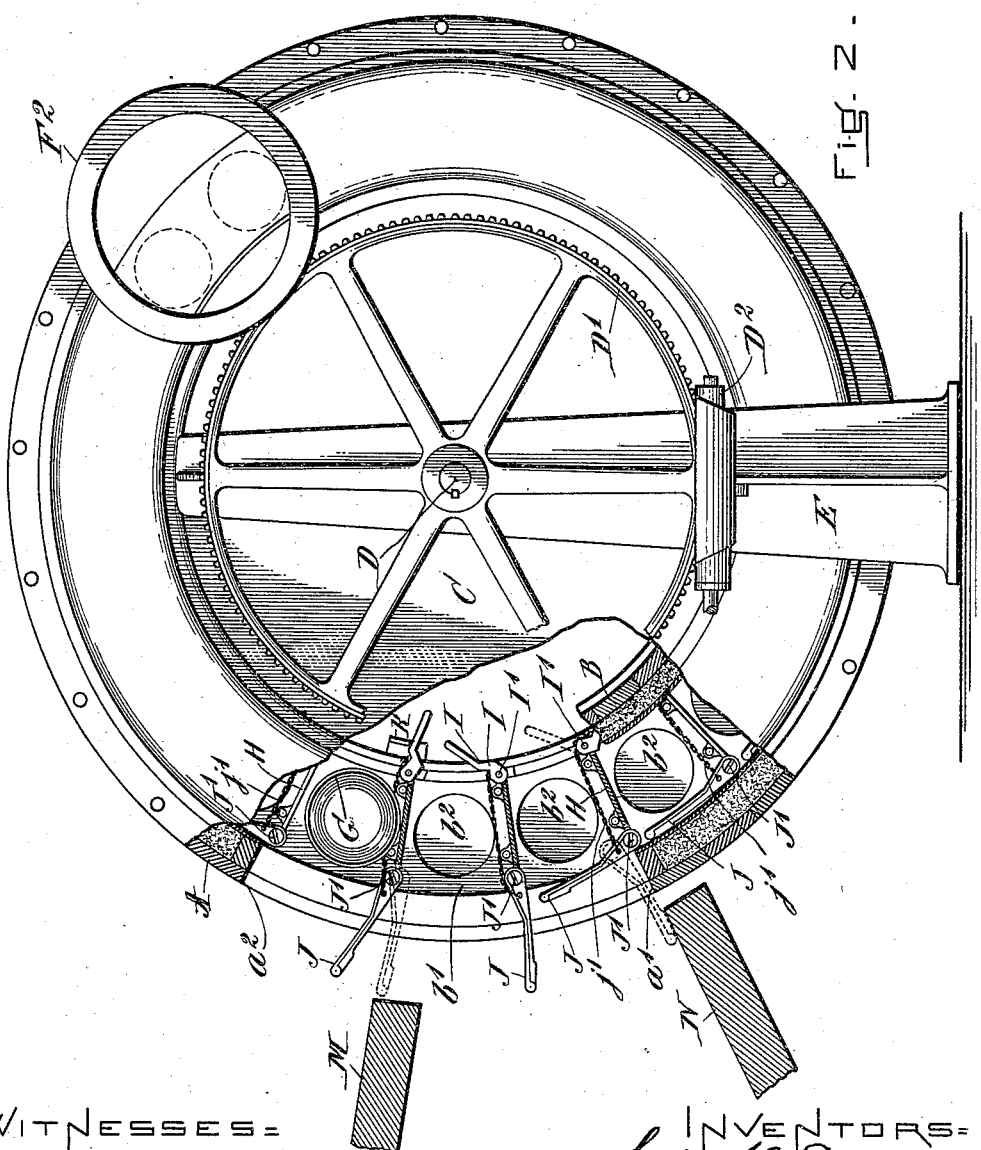

In these drawings Figure 1 is a vertical longitudinal section of a heating apparatus; and Fig. 2 is an end elevation view from the right side of Fig. 1 partially broken away, to disclose the interior arrangements.

The apparatus illustrated in these drawings consists of a cylindrical shell A which is composed preferably of good heat insulating material, the said shell being segmental in form terminating at $a'$ and $a^2$ as seen in Fig. 2. Inside the shell A the carrier B is mounted. This carrier is cylindrical in form and has its inner walls preferably constructed of good heat insulating material, this cylindrical portion being supported at its ends by the spider rings C. Upon the outer peripheral portion of these spider rings the flanges $b$, $b'$ are formed, these flanges being apertured at $b^3$ and $b^2$. Radial partitions H are secured at their ends to the flanges $b$, $b'$, and serve to divide the carrier into a suitable number of peripheral compartments; the apertures $b^2$, $b^3$, are located in the flanges at the ends of these compartments. We provide also gates J which are pivoted at $J'$ at or near the outer edges of the radial partitions H; these gates are so proportioned and placed that, when closed, they pass just within the inner surface of the segmental shell A. Closure of these gates is accomplished by the mechanism illustrated in Fig. 2; pivoted latches I are mounted around the inner periphery of the carrier upon pivots $I'$ and are secured to the gates J by flexible connections such as the chains $j'$. A stop K is secured to a stationary portion of the apparatus, to wit, the outside of the segmental hot air head $F'$. The location of this stop is shown in Fig. 2. The rotation of the carrier B is controlled by the shaft D which is keyed to the spider rings C and to the worm wheel $D'$; the latter is slowly rotated by means of the worm $D^2$, which may derive movement from any suitable source. The hot air heads F, $F'$, constitute preferably part of the casting of the stationary frame and are secured to the standards E, $E'$, and extend around the ends of the apparatus so as to deliver and remove air from the compartments in the periphery of the carrier. Air is introduced into the apparatus through the conduit $F^2$ and escapes through a similar conduit $F^3$.

For the proper confinement and re-shaping of such articles as collars by the above described apparatus, we provide a suitable number of metal rings G. These rings can easily be rolled into any one of the compartments in the carrier through the aperture between the edges $a'$, $a^2$, of the segmental shell when the gates J are open and can as easily roll out of the said compartments when released by the opening of the gates. For the proper introduction of the holders G, we provide an inclined shelf M, and a lower shelf N for their removal.

The operation of the above described apparatus is as follows: After final inspection, collars usually tied in bundles of a dozen each, are tightly rolled and a bunch inserted in each of the holders G which are of such proportions as to retain the bunches of collars in rolled condition. The movement of the carrier B brings its compartments successively abreast of the aperture in the shell A, each compartment moving from the edge $a'$ to the edge $a^2$ of said shell. As one of the open gates J approaches the lower edge of the shelf M, a number of holders G each containing a roll or bunch of collars is allowed to roll down the shelf over the gates J. As the carrier continues its movement, the latch I strikes the stop K and is depressed thereby, drawing the chain $J'$ and closing the gate J which then passes under the edge $a^2$ of the shell. Meanwhile, dry hot air is blown through the apparatus from the aperture $F^2$ to the aperture $F^3$ passing from the hot air heads F, $F'$ through all of the compartments in the carrier which are, for the time being, covered by the shell A. As each compartment emerges past the edge $a'$ of the shell A the gate J falls open of its own weight, being assisted to do so by the weight of the holders G, and the holders roll down upon the shelf N when the reshaped collars can be removed and put in their boxes.

What we claim and desire to secure by Letters Patent is:

1. In an apparatus for re-shaping articles of manufacture such as finished collars, the combination of a movable carrier; divided into compartments, a shell outside the carrier, said shell provided with an aperture through which the carrier compartments are successively exposed, and means to maintain dry heat in the compartments which are within the shell.

2. In an apparatus for re-shaping articles of manufacture such as finished collars, the combination of a movable carrier divided into compartments, removable holders adapted to lodge in said compartments, a shell outside the carrier, said shell provided with an aperture through which the carrier compartments are successively exposed for the insertion and removal of the holders, and means to maintain dry heat in the compartments which are within the shell.

3. In an apparatus for re-shaping articles of manufacture such as finished collars, the combination of a movable carrier divided into compartments, gates for said compartments, a shell outside the carrier, said shell provided with an aperture through which the carrier compartments are successively exposed and means to open and close the gates as the compartments thereof are exposed and covered by the shell.

4. In an apparatus for re-shaping articles of manufacture such as finished collars, the combination of a movable carrier divided into compartments, gates for said compartments, removable holders adapted to lodge in said compartments, a shell outside the carrier, said shell provided with an aperture through which the carrier compartments are successively exposed for insertion and removal of the holders, means to open and close the gates and means to maintain dry heat in the compartments which are within the shell.

5. In an apparatus for re-shaping articles of manufacture such as finished collars, the combination of a movable carrier, divided into compartments, a shell outside the carrier, provided with an aperture through which the compartments are successively exposed, gates for said compartments, latches and flexible connections between each latch and a gate, a fixed stop to engage the latches to move them and close the gates through the said connections, a feeding shelf near the upper part of the shell aperture and a delivery shelf near the lower part of said aperture, and cylindrical holders to hold the articles to be re-shaped, and means to maintain dry heat in the compartments within the shell.

6. In an apparatus for re-shaping articles of manufacture such as finished collars, the combination of a revolubly mounted cylindrical carrier, provided with a series of peripheral compartments, a segmental cylindrical shell partially inclosing the carrier and provided with an aperture through which the compartments are successively exposed, and means to maintain dry heat in the compartments which are within the shell.

7. In an apparatus for re-shaping articles of manufacture such as finished collars, the combination of a revolubly mounted cylindrical carrier provided with a series of peripheral compartments, removable holders for articles to be reshaped, adapted to lodge in said compartments, a segmental cylindrical shell partially inclosing the carrier and provided with an aperture through which the compartments are successively exposed for the insertion and removal of the holders and means to maintain dry heat in the compartments within the shell.

8. In an apparatus for re-shaping articles of manufacture such as finished collars, the combination of a revolubly mounted cylindrical carrier provided with a series of peripheral compartments, a cylindrical segmental shell partially inclosing the carrier and provided with an aperture through which the compartments are successively exposed, gates for said compartments, hinged to the carrier, and means to first open and then to close said gates successively as the compartments thereof are successively exposed and covered by the shell, and means to maintain dry heat in the compartments which are within the shell.

Signed by us at Troy, New York this twenty-fourth day of May 1909.

LORING V. ESTES.
WILLIAM FORWARD.

Witnesses:
  KATHERINE A. CARROLL,
  CHARLES M. HORTON.